(12) United States Patent
Przekop (10) Patent No.: US 9,670,071 B2
(45) Date of Patent: Jun. 6, 2017

(54) METHOD AND APPARATUS FOR WASH WATER TREATMENT

(71) Applicant: Jerome Przekop, Novi, MI (US)

(72) Inventor: Jerome Przekop, Novi, MI (US)

(*) Notice: Subject to any disclaimer, the term of this patent is extended or adjusted under 35 U.S.C. 154(b) by 661 days.

(21) Appl. No.: 14/050,829

(22) Filed: Oct. 10, 2013

(65) Prior Publication Data

US 2014/0138329 A1    May 22, 2014

Related U.S. Application Data

(63) Continuation-in-part of application No. 12/859,142, filed on Aug. 18, 2010, now abandoned.

(51) Int. Cl.
| | |
|---|---|
| *C02F 1/00* | (2006.01) |
| *B01D 29/90* | (2006.01) |
| *B01D 17/00* | (2006.01) |
| *C02F 101/32* | (2006.01) |

(52) U.S. Cl.
CPC .............. *C02F 1/004* (2013.01); *B01D 17/10* (2013.01); *B01D 29/90* (2013.01); *C02F 2101/32* (2013.01); *C02F 2201/008* (2013.01); *C02F 2209/40* (2013.01); *C02F 2209/445* (2013.01); *C02F 2303/24* (2013.01)

(58) Field of Classification Search
None
See application file for complete search history.

(56) References Cited

U.S. PATENT DOCUMENTS

| | | | | |
|---|---|---|---|---|
| 3,757,957 A | * | 9/1973 | Smith .................... | B01D 29/27 210/486 |
| 4,325,823 A | * | 4/1982 | Graham ................ | C02F 3/1242 210/104 |
| 5,599,058 A | * | 2/1997 | Carter ...................... | B60P 3/08 296/186.1 |
| 2005/0139530 A1 | * | 6/2005 | Heiss ....................... | C02F 9/00 210/85 |

* cited by examiner

*Primary Examiner* — Richard Gurtowski
(74) *Attorney, Agent, or Firm* — Vincent Re PLLC (57) ABSTRACT

A portable waste water treatment apparatus can be used to treat a flow of waste water in an industrial setting. The apparatus includes a waste water reservoir, a pump within the apparatus transferring a flow of waste water from the waste water reservoir to a filter, the filter which is configured to treat the flow of waste water, a treated water reservoir receiving and holding the treated water, and a shell encapsulating and permitting unitary transport of the waste water reservoir, the pump, the filter, and the treated water reservoir. The filter of the apparatus is further configured to remove oil from the flow of waste water. The treated water can be dispensed from the treated water reservoir upon demand.

7 Claims, 5 Drawing Sheets

METHOD AND APPARATUS FOR WASH WATER TREATMENT

CROSS REFERENCE TO RELATED APPLICATIONS

This disclosure is a continuation-in-part of U.S. patent application Ser. No. 12/859,142 filed on Aug. 18, 2010 which is hereby incorporated by reference.

TECHNICAL FIELD

This disclosure is related to waste water treatment apparatuses, and particularly to those that treat wash water.

BACKGROUND

The statements in this section merely provide background information related to the present disclosure and may not constitute prior art. As the environment becomes an increasing concern, regulations are becoming more stringent with respect to handling waste. In particular, municipal water treatment facilities are requiring industrial and other commercial facilities to treat wastewater, such as water used in cleaning floors or other surfaces, outside of the municipal water treatment facilities. Some industrial facilities have the capability to treat wastewater on-site but many do not. Therefore, the industrial facilities have the wastewater stored, removed, and treated off-site. This can be costly for the storage facilities as the storing and shipping of wastewater may occur as frequently as daily or weekly depending upon on-site storage capabilities.

Typically, if a waste water treatment facility is a part of the facility, it is located in separate building. Therefore, it is necessary to transport the waste water to the facility when the water is no longer in use. This may be pumped to the facility or stored and delivered on regular intervals. Known facilities treat water to or near drinking water quality with a focus on removing all or nearly all contaminates from the water.

SUMMARY

A portable waste water treatment apparatus can be used to treat a flow of waste water in an industrial setting. The apparatus includes a waste water reservoir, a pump within the apparatus transferring a flow of waste water from the waste water reservoir to a filter, the filter which is configured to treat the flow of waste water, a treated water reservoir receiving and holding the treated water, and a shell encapsulating and permitting unitary transport of the waste water reservoir, the pump, the filter, and the treated water reservoir. The filter of the apparatus is further configured to remove oil from the flow of waste water. The treated water can be dispensed from the treated water reservoir upon demand.

BRIEF DESCRIPTION OF THE DRAWINGS

One or more embodiments will now be described, by way of example, with reference to the accompanying drawings, in which.

DETAILED DESCRIPTION

Figure 1:
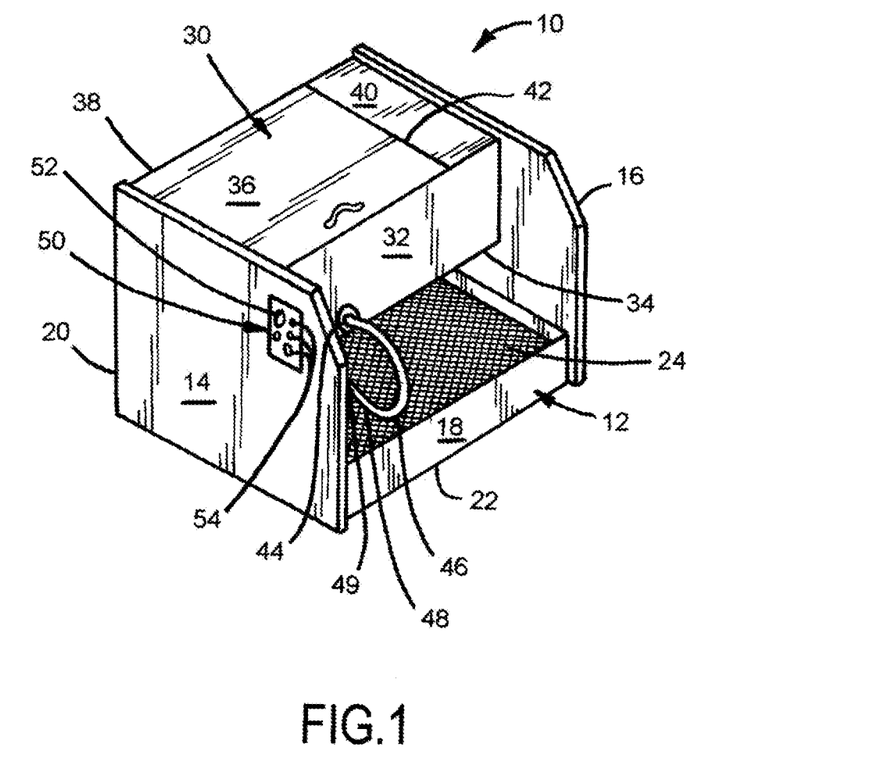
FIG. 1 schematically illustrates a transportable waste water treatment apparatus for treating waste water by separating desirable water and cleansing agents from undesirable dirt and oils in accordance with the present disclosure.

Referring now to the drawings, wherein the showings are for the purpose of illustrating certain exemplary embodiments only and not for the purpose of limiting the same, FIG. 1 schematically illustrates a transportable waste water treatment apparatus 10 for treating waste water by separating desirable water and cleansing agents from undesirable dirt and oils. The wastewater treatment apparatus 10 includes a waste water reservoir 12, a first side 14, a second side 16, and a treated water reservoir 30. The waste water reservoir 12 is a watertight storage tank created from the first side 14, the second side 16, a front 18, a base 22, and a back 20. The waste water reservoir 12 additionally includes grating 24 interconnecting the first side 14, the second side 16, the front 18, and the back while being distally spaced from the bottom 22. The grating 24 allows water to pass into the waste water reservoir 12 while keeping large particulate from entering the waste water reservoir 12. The grating 24 can be wholly or partially removable to provide access to the waste water reservoir 12. It will be apparent to one of ordinary skill in the art that partially removable grating 24 includes a hinged or removable panel portion without varying from the scope of the invention. It will also be apparent that the waste water reservoir 12 can be a separately removable reservoir that is placed within a framework of the waste water treatment apparatus 10 without varying from the scope of the invention.

The treated water reservoir 30 is generally an enclosed watertight storage tank created from the first side 14, the second side 16, a front 32, a base 34, a top 36, and a back 38. The top 36 includes an access door 39 for accessing the treated water reservoir 30 and a filter door 40 for accessing a filter compartment 42. An outlet 44 is attached on or near the base 34 for providing a flow of treated water. The outlet 44 can provide treated water flow from a gravity feed and manual or electrically operated outlet pump by way of a transfer hose 46. The transfer hose 46 includes an outlet 48 that can have a nozzle 49 attached thereto for controlling the flow of treated water. It will be apparent to one of ordinary skill in the art that the treated water reservoir 30 can be a separately removable reservoir that is placed within a framework of the waste water treatment apparatus 10 without varying from the scope of the invention. Watertight reservoirs means designed to prevent water from leaking from either waste water reservoir 12 or treated water reservoir 30. The reservoirs 12 and 30 can be welded panels of coated steel, aluminum, or other metallic substance, can be produced with various types of molded plastic, and/or lined with rubber or plastic material such that water impermeability and corrosion resistance is assured.

A control panel 50 is positioned for easy access by a user, e.g., on the first side 14, second side 16, front 32, and a separate panel adjacent the front 32. The control panel 50 can include a warning identifier 52, such as a visual indicator or audible indicator, for creating a notification(s) related to the operation of the waste water treatment apparatus 10. The control panel 50 can also include switchable controls 54 for independently activating various components of the waste water treatment apparatus 10 as will be detailed below.

Figure 2:
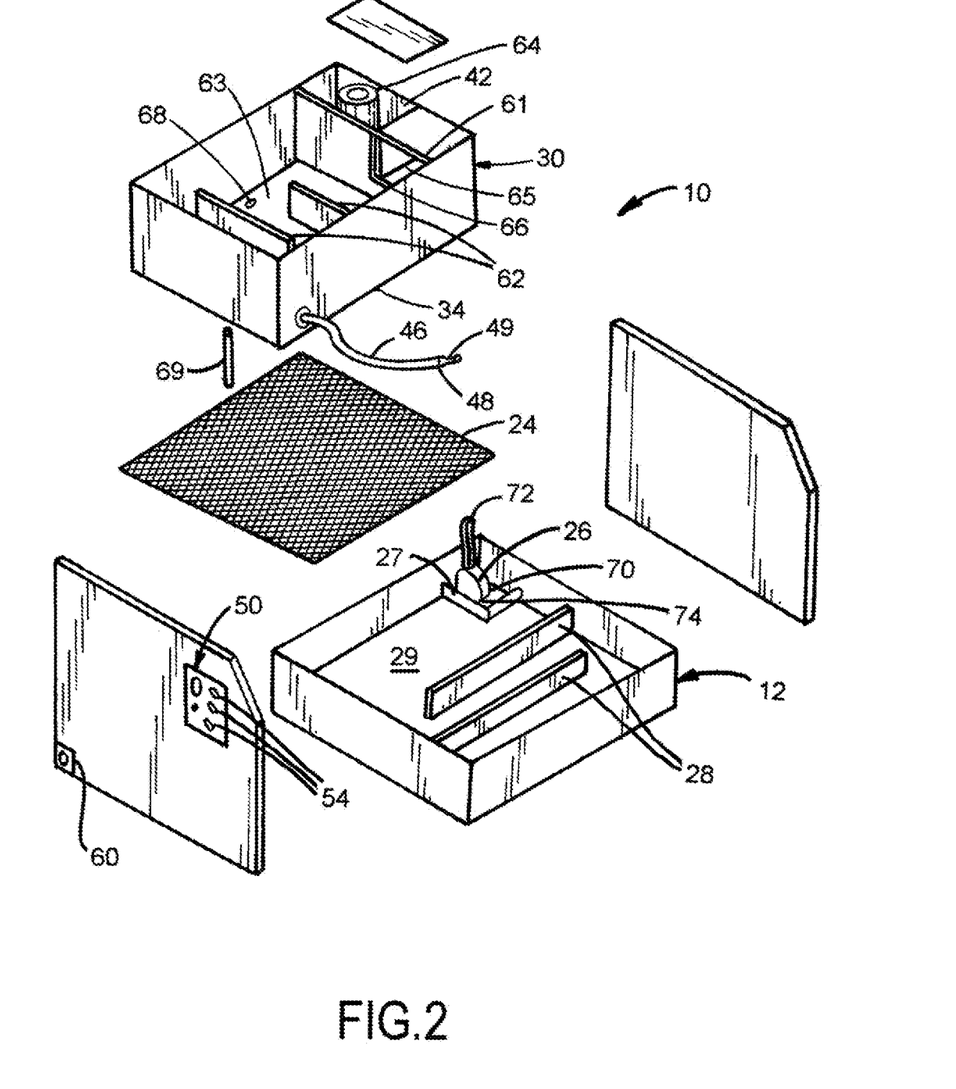
FIG. 2 depicts an exploded and partial sectional view of the waste water treatment apparatus in accordance with the present disclosure.

FIG. 2 depicts an exploded view of the waste water treatment apparatus 10. The waste water reservoir 12 includes a transfer pump 26 for transferring water stored in the waste water reservoir 12 to the treated water reservoir 30. The transfer pump 26 is actuated internally when a certain amount of waste water has been stored in the waste water reservoir 12 or actuated by one of the switchable controls 54 located on the control panel 50. The transfer pump 26 includes an inlet 70 and an outlet 72. The inlet 70 can include a screen 74 for preventing particulate matter capable of entering the waste water reservoir 12 through the grating 24 from entering the pump 26. The outlet 72 directs water flow from the waste water reservoir 12 to the treated water reservoir 30 and particularly to the filter compartment 42.

The waste water storage tank 12 can include a plurality of baffles 28 to slow entering water flow from the front of the waste water storage tank 12 to the rear, and particularly, to the pump 26. The pump 26 is surrounded by a low baffle 27 to prevent settled particulate from entering the pump when activated. Slowing entering water from the front assists in separating solid particulate from the waste water. The baffles 28 are a series of walls capable of slowing waste water flow down. A particulate separation panel 29 can be placed above the base 22. The particulate separation panel 29 has a plurality of apertures to allow the solid particulate to precipitate out of the waste water. It will be appreciated that the baffles 28 and the separation panel 29 can be used individually or in combination. It will be recognized when the separation panel 29 is utilized, a clean-out panel can be fitted to facilitate the removal of the settled solid particulate. The waste water storage tank 12 includes a clean-out outlet 60 for facilitating waste water removal when necessary. The clean-out outlet 60 may be actuated by a manual valve or electrically operated valve actuated by one of the switchable controls 54 located on the control panel 50.

The treated water reservoir 30 includes the filter compartment 42 that houses a filter element 64. The filter compartment 42 includes a low baffle wall 65 to permit water to exit the filter compartment 42 and into a holding tank 61. The holding tank 61 includes a slightly taller baffled wall 66 to slow the filtered water flow down from the filter compartment 42 to the treated water reservoir 30. The holding tank 61 assists in settling out any particulate matter that may have passed through the filter element 64.

The filter element 64 is generally cylindrical and positioned within the filter compartment 42 for filtering the waste water pumped from the waste water reservoir 12 before entering the treated water reservoir 30. The filter element 64 can include different flow rates such as a high flow filter element, e.g., capable of filtering approximately 13.6 liters per minute, or a low flow filter element, e.g., capable of filtering approximately 2.3 liters per minute. The filter element 64 being the high flow element can have a filtering capacity of, e.g., 1, 3, or 5 microns, and the filter element 64 being the low flow element can have a filtering capacity of, e.g., 1 micron. The pump 26 also has a flow rate that can be tailored to the filter flow rates that can be selectable by one of the switchable controls 54 on the control panel 50 to match the filter element 64 being used. Alternatively, each waste water treatment apparatus 10 can be designed to operate in only one of high flow or low flow rates.

The filter element 64 in either the high flow or low flow rate is capable of filtering waste water, such as water used for cleaning, i.e., having a composition of a desirable component, e.g., cleansing agents and water, and an undesirable component, e.g., dirt and oils. The filter element 64 is capable of filtering out the undesirable components from the desirable components. Upon filtering the undesirable components, e.g., dirt and oils from the desirable components, e.g., cleansing agents and water, are stored within the treated water reservoir 30 for later disbursement when cleaning is desired.

The treated water reservoir 30 can include a plurality of baffles 62 to slow the water flow down from the filter compartment 42 to the outlet 44 to assist in separating solid particulate from the waste water. The baffles 62 are a series of walls capable of slowing waste water flow down. A particulate separation panel 63 above the base 34. The particulate separation panel 63 has a plurality of apertures to allow any remaining solid particulate to precipitate out of the filtered water. It will be recognized when the separation panel 63 is utilized, a clean-out panel can be fitted to facilitate the removal of the settled solid particulate. It will be appreciated that the baffles 62 and the separation panel 63 can be used individually or in combination. It will be recognized when the separation panel 63 is utilized, a clean-out panel can be fitted to facilitate the removal of the settled solid particulate.

The treated water reservoir 30 includes a treated water return 68. The treated water return 68 permits a small amount of treated water to flow from the treated water reservoir 30 in to the waste water reservoir 12. The flow can be automated, e.g., controlled by a mechanical or electrical timer to open a valve to allow flow during predetermined times, manually, e.g., operated by a switch 54 located on the control panel 50, and controlled by pressure, e.g., upon a certain volume of water entering the treated water reservoir 30 the pressure valve opens allowing water to flow. A flow tube 69 can be attached thereto to provide a directed flow of water. The constant rotation of water prevents stagnation of water in both the waste water reservoir 12 and the clean water reservoir 30. Preventing water from stagnating assists in maintaining acceptable storage of water.

The waste water treatment apparatus 10 can be used in commercial facilities such as industrial complexes, factories, or retail establishments where space is at a premium. The waste water treatment apparatus 10 can be positioned in an unobtrusive way as to not interfere with other functions of the facility. The volume of water to be treated from one facility to the next can be variable. The exemplary waste water treatment apparatus 10 holds a similar volume of fluid for the waste water reservoir 12 and the treated water reservoir 30, e.g., 662 liters, or can hold a differing amount of fluid, e.g., 549 and 662 liters respectively. A very large facility requiring additional fluid can have several waste water treatment apparatuses 10 next to each other, space them separately around the facility, or have larger capacity reservoirs attached thereto.

In use, a facility is cleansed, i.e., cleansing agents are added to dispensed water for manual, e.g., a mop and bucket, or assisted, e.g., industrial scrubbing machines, cleaning. Upon completion of cleansing, the waste water includes desirable components of, e.g., water and cleansing agents combined with undesirable components of, e.g., dirt and oils. The waste water may then be deposited in the waste water reservoir 12. Large particulate matter is filtered out by the grating 24 as the waste water passes through the grating 24 and into the waste water reservoir 12. The provided baffling 28 slows the flow of the waste water allowing for particulate matter to precipitate out of the waste water and be deposited on the base 22. The separation panel 29 maintains separation of the settled particulate matter from the waste water and prevents intake into the pump 26.

Upon reaching a certain level of waste water within the waste water reservoir 12, the transfer pump 26 is automatically activated to pump the waste water to the filter compartment 42. Alternatively, the transfer switch 54 can be activated by an operator to transfer the waste water in the waste water reservoir 12 to the filter compartment 42. It will be appreciated that with a manual switch a timer can be included to automatically terminate the transfer pump 26 operation upon reaching a preset time limit. The waste water is passed through the filter element 64 for removing the undesirable components of the waste water. The remaining waste water desirable components are passed through the filter element 64 as treated water to be stored in the treated water reservoir 30. Once the treated water reaches a certain level in the filter compartment 42, the treated water flows over the low baffle wall 65 and into the holding tank 61. The treated water reaches a predetermined volume in the holding tank 61 and passes over the slightly taller baffled wall 66 and into the waste water reservoir 30. The baffling 62 slows the flow of the treated water to permit any additional particulate matter to further precipitate out of the desirable components of the treated water.

When facility cleansing is again desired, treated water is transferred from the treated water reservoir 30 to a container for manual or assisted cleaning. The treated water is transferred by positioning the outlet 48 of the hose 46 to dispense the treated water into the manual or assisted cleaning containers. The treated water is transferred by either manually or by actuating one of the switchable controls 54. If a nozzle 49 is used, the nozzle 49 can be actuated to dispense the treated water. No additional cleansing agents are required to be added to the treated water as the desirable components of cleansing agents and water are transferred to the container.

The filter 42 is required to be changed based upon usage and can be dependent on time or volume of waste water treated. When the waste water treatment apparatus includes the warning identifier 52, the warning identifier 52 sets a warning either optically, audibly, or both when a computer, flow rate monitor, or manual timer activates the warning identifier 52. Otherwise, the filter 42 will be changed as identified by time, e.g., a number of days, and number of cycles the pump has been activated.

Changing the filter requires the opening of the filter door 40 and replacing the used filter with a replacement filter element 64. If the filter element 64 has a different flow rate characteristic, the appropriate pump flow rate can be selected by one of the switchable controls 54.

When the waste water treatment apparatus 10 is desired to be cleaned or the waste water is desired to be removed, a hose can be connected to the clean-out outlet 60. After the hose is connected, a clean-out valve is opened, either manually or actuated by one of the switchable controls 54, to dispense the waste water. Alternatively, the waste water may be removed by pumping out the waste water after removal of the grating 24 or opening the access panel. The treated water reservoir 30 may be emptied through outlet 44 or by being pumped out through access panel 62. The water removed from the waste water treatment apparatus 10 is stored in transportable tanks for removal to off-site treatment facilities. Alternatively, if removable waste and treated water reservoirs 12 and 30, respectively, are used for the waste water reservoir 12 and the treated water reservoir 30, the waste and treated water reservoirs 12, 30 can be removed and replaced with empty reservoirs 12, 30.

Known devices can filter mop water, however, known devices typically filter approximately 200 gallons of waste water per day. The disclosed device filters approximately 200 gallons of waste water per hour. The filter utilized by the device is important to achieving a useful throughput of treated water through the device. A selection of filter includes selection of the size of pores or holes in the filter surface. A hole size too small causes the filter to clog immediately or after brief operation. A hole size too large causes the filter to ineffectively treat the waste water. Testing has shown an exemplary filter with a maximum 98% micron rating of between 3 and 10 works well for waste water. In particular, a filter with a maximum 98% micron rating of 5 works well with the disclosed device. Additionally, a filter that is too small will not be able to treat a desired flow of waste water. An exemplary non-limiting filter useful for use with the disclosed device includes a seven inch diameter by thirty two inch long filter bag manufactured by Filter Specialists, Inc. under the item number BOS5PM2P. Such an exemplary filter bag is constructed from polypropylene and includes an exemplary maximum 98% micron rating of 5. Such a filter can be utilized within a matching filter vessel, exemplified by a metallic tube housing the filter and enabling quick replacement of the filter, known in the art. In testing, one could define the filter bag dimensions for that particular bag configuration as a minimum filter size that could achieve the resulting device capacity of 200 gallons per minute. Such a filter bag could be defined by a minimum surface area of the filter of 703 square inches. The specifications of the filter that can be used is exemplary. One could select a filter with different materials and different specifications with similar treatment capacities for use with the disclosed apparatus.

Known small devices for treating waste water include use of a holding tank, such as a bucket, in which waste water is permitted to sit for an extended period of time. Over time, the oil and water tend to separate, and the water can be drawn off the bottom of the settling tank. Such a settling tank can frequently be identified by two outlet tubes, where one is situated to remove oil from a top of the tank and the other is situated to remove water from the bottom of the tank. Such a system is inherently low capacity, as the settling tank requires time to operate, or requires a very large tank to increase the amount of waste water that is being permitted to settle. Higher capacity, fixed systems with large tanks and complicated equipment frequently use chemicals to cause oil in the waste water to solidify and precipitate out of the waste water flow.

The disclosed system requires neither a settling tank nor use of chemicals to solidify oil. Use of the disclosed range of filters permits the filter to remove oil from the waste water. Additionally, use of baffling that draws water off of a bottom or near a bottom of a waste water flow can separate water and oil in a waste water flow. Such a system, utilizing a filter and/or baffling to separate oil from a waste water flow to create a treated water flow with greatly reduced oil content can treat a flow at a higher rate than typical settling tank systems and without the equipment and multiple tanks required to use chemicals to remove oil from a waste water flow.

Figure 3:
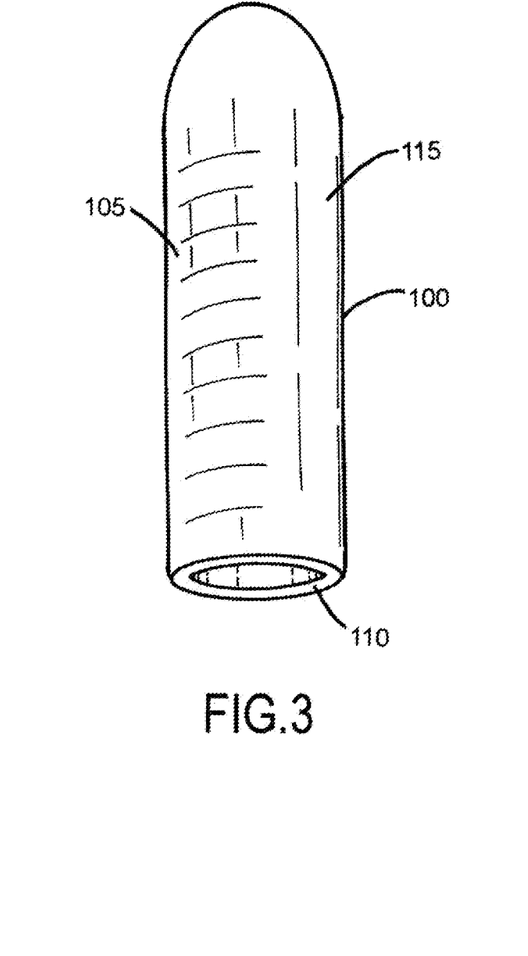
FIG. 3 illustrates in detail an exemplary replaceable filter that can be used in accordance with the present disclosure.

FIG. 3 illustrates in detail an exemplary replaceable filter as an embodiment of filter element 64 for use in a waste water treatment apparatus. Filter 100 includes an elongated body 105 and a fitting interface 110. Interface 110 is configured to securely mount to outlet 72 and to receive a flow of waste water from pump 26. Filter 115 can be constructed of a number of different materials with different specifications.

Figure 4:
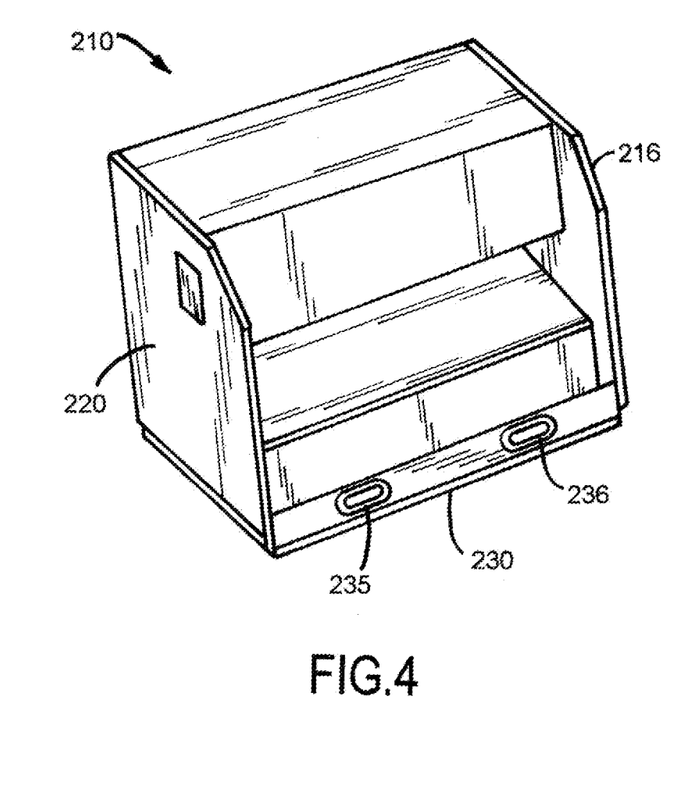
FIG. 4 illustrates a waste water treatment apparatus configured for mobile operation in an industrial setting in accordance with the present disclosure.

FIG. 4 illustrates a waste water treatment apparatus configured for mobile operation in an industrial setting. One having skill in the art will appreciate that machines that are moved throughout a manufacturing facility take abuse and must be rigidly constructed to have a useful lifespan within the facility. Forklifts move around the facilities. Manufactured parts and bins carrying parts are constantly moving though such a facility. Employees in such a facility are required to take detailed training to remain safe within the facility. The apparatus disclosed herein can be constructed within or as a steel shell. Edges between walls creating the shell can be welded or otherwise durably joined, such that incidental contact with heavy objects such as a forklift will not destroy or disable the apparatus. FIG. 4 illustrates apparatus 210 configured for mobile operation within an industrial facility. Walls of the apparatus including wall 216 and 220 are constructed of ¼ inch steel or a similar durable material of sufficient thickness to withstand abuse in an industrial facility. In one embodiment, ¼ inch steel can be used as a minimum thickness of the walls of the shell to protect the apparatus. Walls 216 and 220 and the rest of the shell of the apparatus can be sized to fit upon transport devices or discreet floor plan sites within a facility. For example, a facility can have commonly sized pallets, dumpsters, clothes hampers, tool chests, etc. such that an order to move one of the commonly sized objects can be easily accomplished by the facility forklifts. The disclosed apparatus can be configured to such a common size. A base 230 is illustrated, including forklift lifting points 235 and 236, enabling the apparatus to be easily deployed within a facility by the vehicles that already move objects within the facility.

Figure 5:
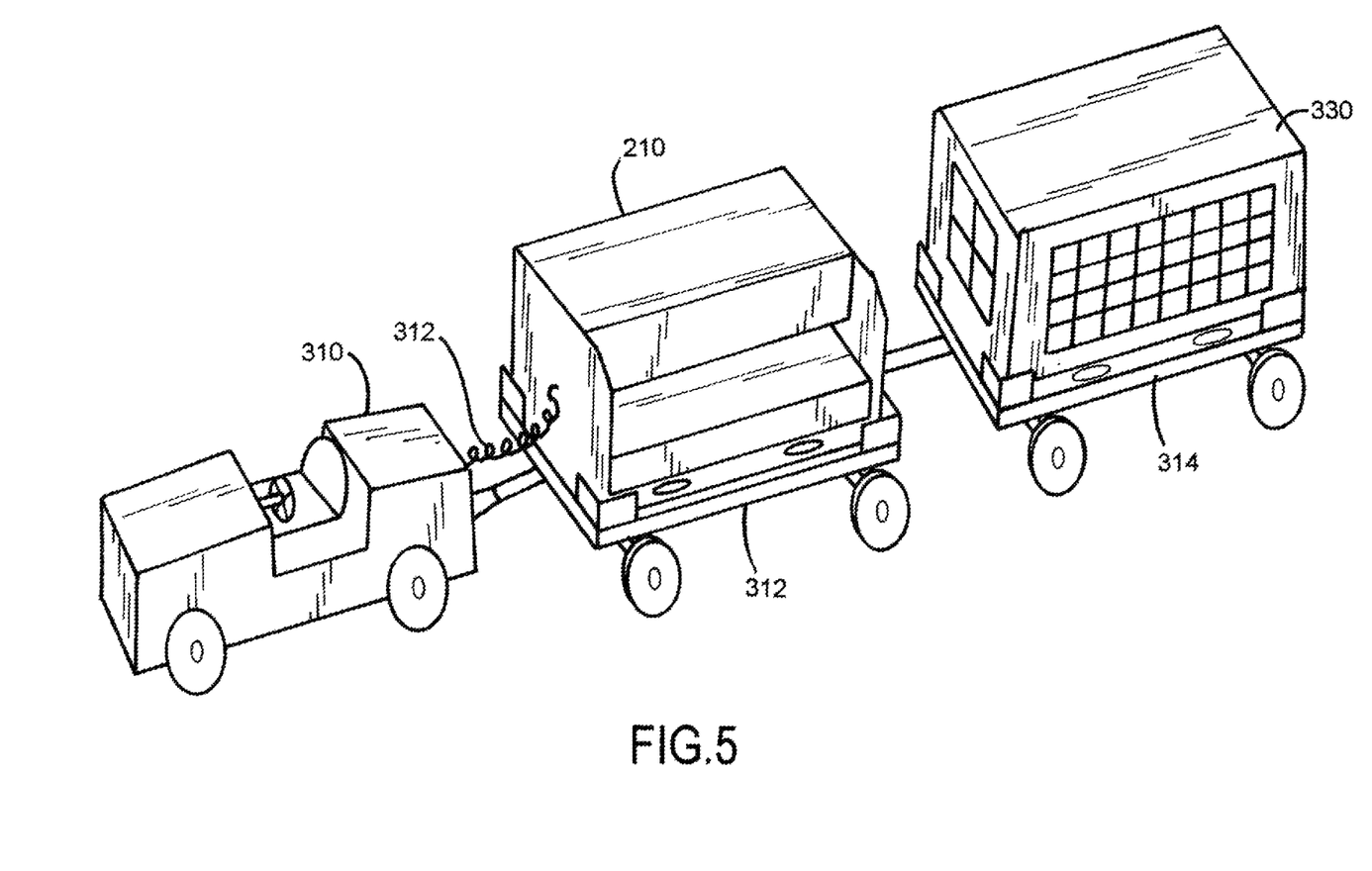
FIG. 5 illustrates the waste water treatment apparatus if FIG. 4 placed upon an industrial cart for transport within a factory in accordance with the present disclosure.

FIG. 5 illustrates the waste water treatment apparatus if FIG. 4 placed upon an industrial cart for transport within a factory in accordance with the present disclosure. Motorized vehicle 310 is illustrated pulling a first cart 312 and a second cart 314. Carts 312 and 314 are used within an industrial facility to move commonly sized objects safely throughout the facility. Waste water treatment apparatus 210 is illustrated loaded onto cart 312. An exemplary dumpster 330 is illustrated loaded onto cart 314. Such a vehicle and cart assembly could travel throughout a large manufacturing facility, collecting dirty waste water and distributing treated waste water to each of a series of departments within the plant. An optional power hookup line 312 is illustrated connecting vehicle 310 to apparatus 210. In this way, the apparatus can be powered while in transit, such that treatment and distribution of treated waste water can be accomplished as a mobile unit.

Figure 6:
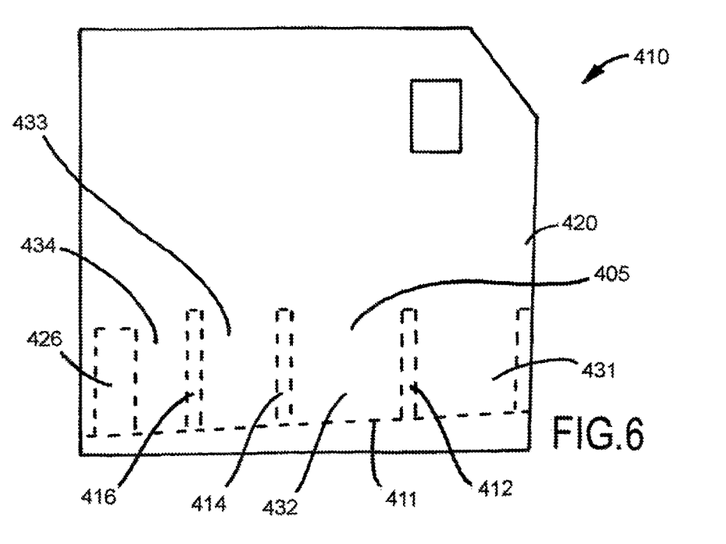
FIG. 6 illustrates an exemplary waste water treatment apparatus including a plurality of baffles separating a waste water reservoir into a series of waste water chambers in accordance with the present disclosure.

FIG. 6 illustrates an exemplary waste water treatment apparatus including a plurality of baffles separating a waste water reservoir into a series of waste water chambers. Baffles are useful to separate particulate matter from waste water, preventing the particulate matter from getting to a pump moving the waste water through a filter to a treated water reservoir. Testing has shown that use of a single baffle or two baffles can be too few to handle a high capacity flow of waste water, as too much particulate matter is caught up in the flow of waste water and bypasses the baffles. Apparatus 410 is illustrated including side panel 420. A waste water reservoir 405 is defined by three vertical baffles 412, 414, and 416 separating the reservoir into a plurality of chambers 431, 432, 433, and 434 and tilted reservoir floor 411. Waste water can be dumped into chamber 431 and can flow past the first baffle 412 into chamber 432. The process can repeat until the waste water reaches pump 426.

Figure 7:
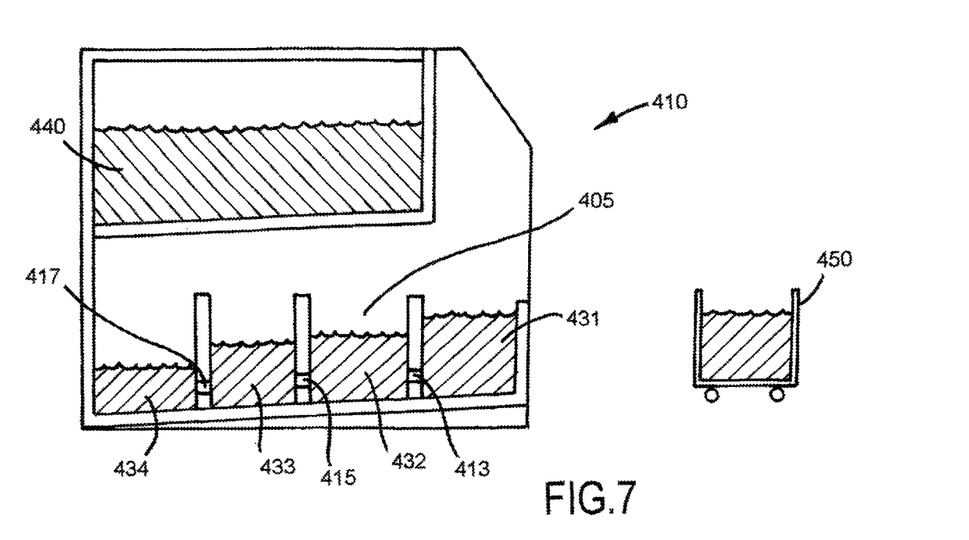
FIG. 7 illustrates the waste water treatment apparatus of FIG. 6 in section view, in accordance with the present disclosure.

FIG. 7 illustrates the waste water treatment apparatus of FIG. 6 in section view. Apparatus 410 is illustrated including waste water reservoir 405 with chambers 431, 432, 433, and 434. Baffles are illustrated including through holes 413, 415, and 417. The illustrated through holes are non-limiting examples of channels that permit the waste water to go around the baffles while causing particulate matter to settle out of the waste water. In one embodiment, the channels can be positioned to cause the water to travel in a zig-zag pattern, from one side of the apparatus to another, thereby causing the water to flow over a longer distance and permitting more settling of the particulate matter. Treated water reservoir 440 is additionally illustrated.

FIG. 7 illustrates that while waste water is being treated in waste water reservoir 405, treated water is contained within treated water reservoir 440. Waste water is treated and stored for later use in reservoir 440. A process for providing treated waste water to a plurality of users in a series of industrial locations can be defined whereby a user can dump dirty waste water from a mop container 450 into reservoir 405 and immediately fill the mop container 450 with treated water from reservoir 440, wherein the treated water was waste water previously poured into the waste water reservoir 405 by a previous user.

The apparatus as disclosed herein has been described with a number of exemplary embodiments. A number of alternative constructions are envisioned without changing the underlying operation of the disclosure. For example, shapes of the structure of the apparatus are exemplary. An apparatus that is square on all sides or shaped like an egg could be constructed that uses similar processes to treat a flow of waste water could be constructed within the scope of the disclosure. Walls constructed of a durable polymer material could be used in place of the steel construction disclosed herein. A hose, duct, or outlet used to dispense the treated water could be constructed according to a number of envisioned embodiments within the scope of the disclosure. A plurality of pumps with smaller filters could be used in place of a single pump with the disclosed filter within the scope of the disclosure.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A portable waste water treatment apparatus, the apparatus comprising:
   a metallic shell comprising two side walls, a rear wall, and a floor surface connected to the rear wall along a rear edge of the floor surface;
   a plurality of vertical walls, each vertical wall spanning between and connected to the two side walls and connected to the floor surface, a first of the vertical walls being connected to a front edge of the floor surface;

a first reservoir comprising a waste water reservoir being defined by a space between the first vertical wall and a second vertical wall, wherein the waste water reservoir is configured to receive waste water being poured into the waste water reservoir;

a second reservoir being defined by a space between the second vertical wall and a third vertical wall;

a third reservoir being defined by a space between the third vertical wall and the rear wall;

a treated water reservoir located between the two side walls and above the third reservoir;

a first pump comprising a filter bag attachment, wherein the first pump draws water from the third reservoir, pumps the water through the filter bag attachment, and pumps the water into the treated water reservoir; and a second pump drawing water from the treated water reservoir and supplying the water to a transfer hose configured to supply water from the treated water reservoir to a container outside of the apparatus;

wherein the second wall comprises at least one opening configured to permit water to flow from the first reservoir to the second reservoir; and wherein the third wall comprises at least one opening configured to permit water to flow from the second reservoir to the third reservoir.

2. The apparatus of claim 1, wherein the filter bag attachment comprises a filter bag including a 98% micron rating between 3 and 10.

3. The apparatus of claim 2, wherein the filter bag includes a 98% micron rating of 5.

4. The apparatus of claim 1, the metallic shell comprising forklift lifting points enabling transport of the apparatus by a forklift vehicle.

5. The apparatus of claim 1, wherein the metallic shell comprises ¼ inch steel with welded joints.

6. The apparatus of claim 1, wherein the first pump is configured to be powered during transport to enable treatment of the waste water during transport.

7. The apparatus of claim 1, wherein the filter bag attachment comprises a filter bag including a minimum surface area of 703 square inches.

* * * * *